Oct. 7, 1947.  P. R. DE PERMENTIER  2,428,359
THERMOSTATICALLY CONTROLLED FIREARM COOLING SYSTEM
Filed March 22, 1945  2 Sheets-Sheet 1
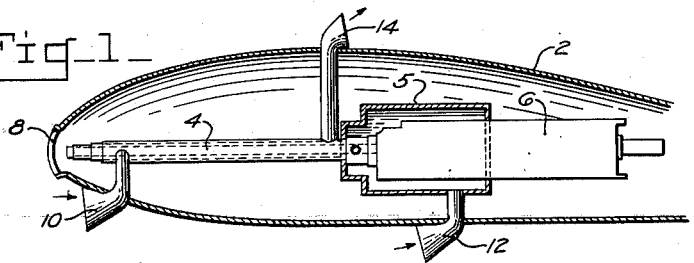
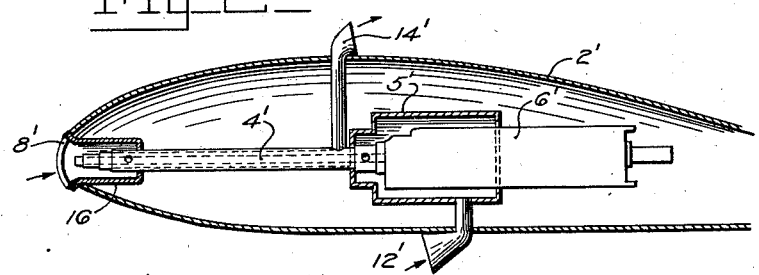
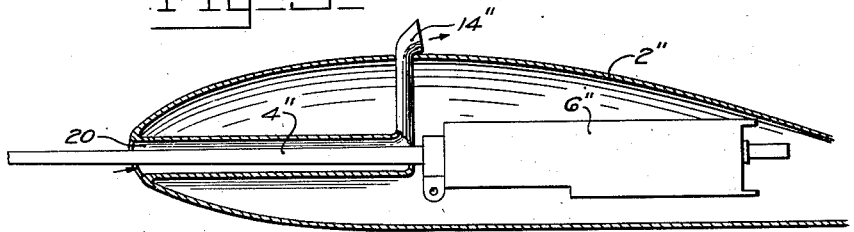
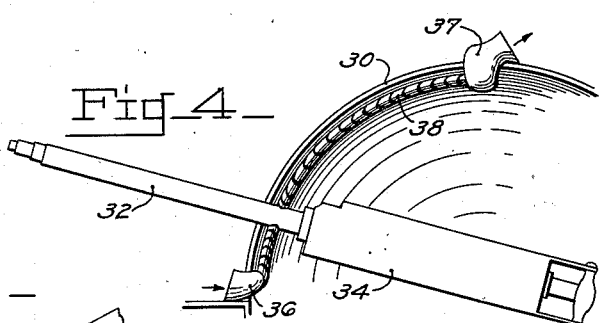
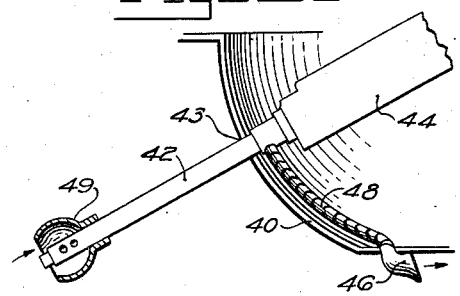
Inventor
PAUL R. DE PERMENTIER,

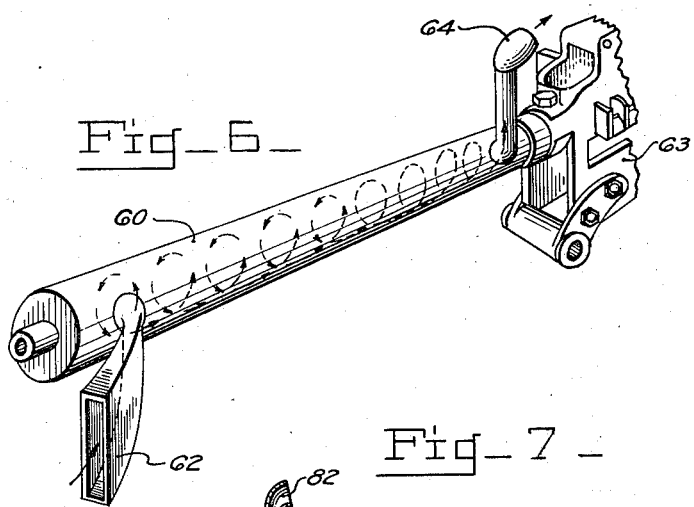
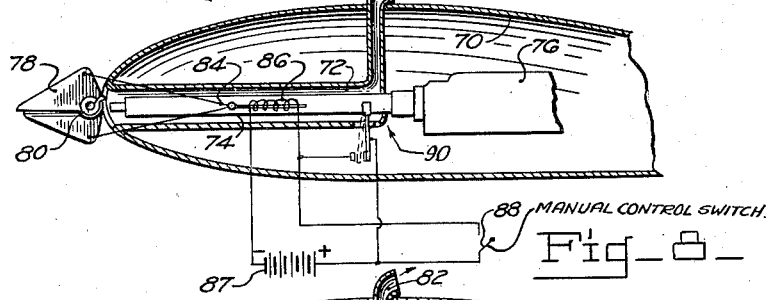
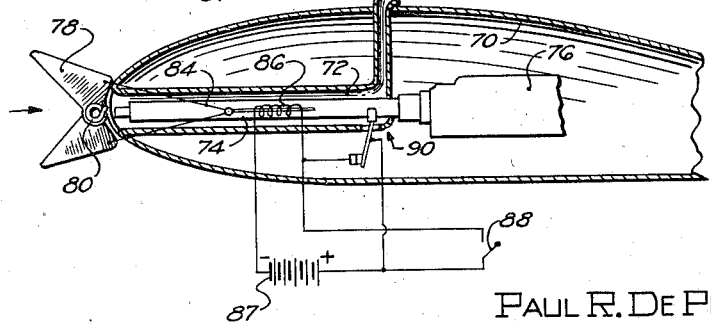

Patented Oct. 7, 1947

2,428,359

UNITED STATES PATENT OFFICE 2,428,359

THERMOSTATICALLY CONTROLLED FIRE-ARM COOLING SYSTEM

Paul R. De Permentier, Casablanca, Morocco

Application March 22, 1945, Serial No. 584,223

2 Claims. (Cl. 89—14.1)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an improved method and apparatus for cooling machine guns and automatic weapons in aircraft by the utilization of the air which is inevitably directed against the aircraft in flight.

It is well known that the life of the barrels of the automatic weapons utilized on aircraft is very short because of the excessive heat created during the firing thereof. Various attempts to air-cool such barrels have been made, perhaps the most conventional method being to provide a perforated jacket around the barrel to permit flow of air therethru and therearound. This method has not been successful because the air passages are too limited and the velocity of air within the jacket is not sufficiently great to provide for what may be referred to as a "forced cooling" of the critical parts of the firing mechanism, such as the barrel and the breech or the bolt, for example.

As a matter-of-fact, it is common knowledge that most jacketed aircraft weapons do not show appreciably better cooling characteristics in flight than when tested on ground. Also, it is known that in the case of fixed guns, such as wing or fuselage guns, the barrel jacket even tends to prevent direct sweeping of the barrel by any cooling air.

Accordingly, it is a principal object of this invention to provide an improved means whereby more efficient cooling is obtained by more or less forcing of the air both directly around the barrel and against various other parts of the mechanism of the weapon. That is to say, according to this invention, a high velocity draft of external air, which is induced by the air flow past the aircraft in flight, is directed onto the weapon in such a way that the maximum cooling benefits are obtained whereby the heat-dissipation qualities of the weapon are notably increased and, consequently, its permissible rate of firing is favorably increased or the permissible duration of firing at the conventional rate is greatly increased.

As will appear, there are various ways in which the general principle of this invention may be utilized to accomplish the objects just mentioned and that while they may vary in detail, they will, as will be shown, function for the same purposes, namely to facilitate the utilization of air pressure against the plane which is necessarily created when the plane is in flight, thru suitable ports, nozzles, shields, fairings, ducts, or openings of any kind or any combination thereof, by compression means or by suction, or a combination of both, whereby external air (thru which, of course, the aircraft is moving) is directed around the barrel of the weapon and against other vital parts which it is desired to cool.

The specific nature of the invention as well as other objects and advantages thereof will clearly appear from a description of a preferred embodiment as shown in the accompanying drawings in which:

Fig. 1 is a schematic cross-section of a wing of an aircraft showing a fixed machine gun with a modified barrel jacket having intake and output air-ducts associated therewith;

Fig. 2 is a similar view showing a different form of intake air-duct;

Fig. 3 is another similar view showing a further modification wherein the gun jacket and intake duct are essentially part of the aircraft;

Fig. 4 is a schematic cross-section of a turret showing a flexible air-duct arrangement for a flexibly mounted weapon;

Fig. 5 is a view somewhat similar to Fig. 4 wherein a flexibly mounted machine gun has positive means whereby the desired draft is directed around the barrel;

Fig. 6 is an isometric view of a weapon having a so-called lateral-type of duct;

Fig. 7 is a schematic view of an aircraft wing with a gun barrel having adjustable cover in closed position and means for controlling the operation thereof; and Fig. 8 is a view similar to Fig. 8 with the cover in open or firing position.

Referring now to the drawings more in detail, the invention will be fully described.

According to the embodiment shown in Fig. 1, there is a wing 2 of an aircraft having a machine gun or other automatic or semi-automatic weapon incorporated therein including a barrel 4 and receiver assembly 6, with the forward or leading edge of the wing 2 having a suitable opening therein thru which the weapon may be fired.

Henceforth, it will be understood that the machine gun or other weapon may be of any desired type and that its construction does not form a part of this invention. That is to say, in all forms, the weapon will have a barrel jacket such as 4 and a receiver or operating assembly such as 6 and will be generally conventional in form, the novelty hereof residing in the various methods whereby the weapon is incorporated in an aircraft and cooled by external air.

It will also be understood that the particular wing structure of the aircraft forms no part of this invention and that, in fact, the weapon cooling means shown in the drawing cannot only be provided for any type of aircraft in combination with any type of weapon, but the means may be incorporated either in the wing or the fuselage of the plane, whichever seems more desirable.

That is to say, the improvement of this invention comprises essentially the forcing of external air into the weapon thru ducts or nozzles etc. which open respectively in positive and negative pressure areas external of the aircraft. In most cases, the barrel-jacket, if employed at all, will be substantially imperforate.

It will also be apparent that the barrel of the weapon may or may not be inclosed in a jacket member and that, furthermore, if a jacket member is used the same may or may not be perforated. In any event, the arrangement will be such that the external air thru which the aircraft naturally proceeds in flight will be forcibly passed around and/or against the barrel and other critical or vital parts of the weapon by means of suitable ducts associated with the aircraft and the weapon which is an essential part thereof.

According to Fig. 1, there is an intake duct 10 in the lower side of the wing 2 and adjacent the leading edge thereof in what may be referred to as a positive pressure area and, in any event, the intake is adapted to receive external air and to direct the same onto the forward end portion of the barrel jacket 4. There also may be an intake duct 12 capable of directing incoming air, induced by the air flow past the plane in flight, into a hollow member defining what may be referred to as a chamber 5 surrounding a portion at least of the receiver assembly of the weapon. In order to achieve the maximum efficiency and most beneficial results, it is also desirable to have an output duct such as 14 which is rearwardly of inlet 10, although it need not necessarily be forwardly of inlet 12 as shown in the drawing.

According to the form shown in Fig. 2, the wing 2' has a weapon therein provided with a barrel jacket 4' and body or receiver assembly represented generally by 6' disposed within a hollow member 5' but here the opening 8' thru which the gun is to be fired and the forward end of the barrel jacket have associated therewith, in any suitable manner, a cup-like member 16 mounted in the leading edge of the wing, and hence in a high pressure area, adapted to facilitate the reception of the cooling air and more forcibly direct it upon the barrel itself. There may, or may not be, another intake duct 12' again located in the positive or high pressure area external of the ring, here shown as the bottom portion of the wing for directing air against the receiver 6' but, in any event, there will preferably be an output duct 14' substantially similar to the duct 14 previously described and directed upwardly and rearwardly into the low pressure area above the wing.

In Fig. 3, a wing 2'' is formed to have an elongated opening 20 thru which barrel 4'', which in this form is preferably unjacketed, projects substantially as shown. The receiver assembly 6'' is in the same relation with respect to the aircraft and the elongated orifice or duct 20 is continuous with an output duct 14'' adapted to perform the same function as the output ducts previously described.

The modification shown in Fig. 4 includes a turret member 30 having associated therewith a so-called "flexible" weapon, such as a machine gun, with the barrel jacket 32 thereof projecting thru a suitable opening provided in the turret. The usual receiver assembly 34 is disposed within the housing. An intake duct 36 is provided in the turret being preferably disposed in a plane below the opening thru which the nozzle or barrel jacket of the weapon projects and this is connected to, or in communication with, an outlet duct 37 thru a flexible tube such as 38, which may consist of any conventional type of flexible hose or the like.

Fig. 5 shows still another modified form of the turret-embodied air-cooling means wherein a turret such as 40 has the barrel jacket 42 of the flexibly-mounted weapon projecting thru a suitable opening 43 therein and a receiver assembly 44. In this form, there is a rearwardly directed output duct 46 and a flexible hose 48 communicating the same within the vicinity of the air inlet 43 and, in addition, a shield-like member 49 is associated with the forward end of the barrel jacket for inducing the reception of the cooling air thereinto so that the same is directed rearwardly thru the jacket and thence into the turret and out duct 46 by way of hose 48.

Still another modification, shown in Fig. 6, discloses a barrel jacket 60 projecting forwardly from a firearm 63 provided with a laterally-arranged intake duct 62 adjacent its forward end and outtake duct 64 adjacent its rear end which is preferably directed upwardly and, of course, rearwardly. With this arrangement, the tendency is for the cooling air to be forced into the intake and assume a whirlwind motion around the barrel within the jacket 60.

The forms shown in both Figs. 7 and 8 are directed to the provision of what may be streamlined covers for the air-intake ducts or nozzles. That is to say, in some cases it may be desirable to prevent, or at least substantially reduce, the forcing of air into the wing or fuselage when firing is not being done and when, therefore, cooling is not necessary.

To this end, there is shown a wing 70 having a forward opening or chamber 72 through which the barrel jacket 74 extends and the receiver assembly 76 of the weapon is disposed within the wing. Cover member 78, preferably of the so-called "clam-shell" type, is associated with the forward side of the aircraft and the weapon adjacent the opening thru which the latter is to fire, and while the operation of this member may be controlled in various ways, there is shown a spring 80 for normally holding the cooperating jaws of the cover member in closed position, as when the gun does not require cooling, but to permit moving thereof to open position when air is desired to be forced into chamber 72 and onto the barrel, and thence out suitable outlet 82.

The opening and closing of this cover member is preferably controlled from within the aircraft, as from the pilot's seat, and this may be obviously accomplished in several ways. That is to say, there may be a thermostatic device or solenoid actuated means whereby the cover may be kept open as long as the weapon requires cooling or the pilot or any other member of the crew may energize the operating mechanism to close or open the "cover" as desired.

In the drawings (Figs. 7 and 8), there are shown control wires 84 actuated by solenoid 86 which may be energized by battery 87 either from the pilot's seat, for example, as by a switch 88, or from a thermostat 90 controlled by the temperature of the barrel and its need for cooling. Preparatory to firing, the gunner closes the switch 88 to thereby energize the solenoid 86 and cause the separation of the cover members 78. Upon firing heat emitted at the gun breech effects the thermostat 90 to continue the energization of the solenoid 86 and hence continue the separation of the cover members 78 after the gunner has released the switch 88.

It will be noted that in all cases the arrangement is such that the weapon may forcibly receive air as the plane is in flight. The air intake duct in each disclosed form of the device designated by the numerals 10, 12, 12', 16, 20, 36, 49, 62 and 72, consists of some form of tubular member, having an outwardly flared end or not, but in any case eventually leading directly against the barrel and preferably adjacent its forward end. At the same time, there is an output having its inner end disposed within the wing or fuselage, whichever the case may be, and its outer end facing in the opposite direction so as to permit the escape of the air and facilitate the velocity of the air flow.

It will be appreciated that the construction of this invention is such that there is created a possible contact of cooling air with critical parts of the weapon at a relatively high velocity and particularly against such parts of the weapon mechanism which would ordinarily be without the stream of air which naturally is forced against the front of the plane when in flight.

With the arrangements heretofore described, it will be noticed that the positive air pressure is taken in from the high pressure area of the wing or fuselage surface and immediately distributed and allowed to become discharged into the low, or what may be referred to as the negative, pressure area, with the result that there is in effect a combined compression and suction force which provides a distributed velocity of flow without producing any objectionable drag.

I claim:

1. In combination, an aircraft wing, an automatic firearm disposed therein to fire forwardly from the leading edge of said wing, a housing about the forward part of said automatic firearm, said housing being in communication as to its interior with the leading edge of said wing, an air outlet of generally tubular cross section extending from the rear end of said housing into the slipstream of the wing being turned backward in said slipstream and being in interior communication with said housing, a cover member of the clamshell type mounted on the forward end of said housing, solenoid means mounted within the aircraft for opening said cover to form an air scoop, thermostatic means responsive to the temperature of the barrel part of said firearm for continuously maintaining the opening of said cover during the emission of heat by said firearm barrel, and spring means on said cover for closing the latter when said solenoid cover opening means is deenergized.

2. A firearm cooling device for installation in a support, comprising in combination a firearm emitting heat during its operation, a duct chamber, axially of which said firearm is disposed and having an air intact port at one end and an air discharge port at the opposite end thereof, a cover member at the air intake end of said duct chamber for releasably restricting the admission of air thereinto, manually operable means for opening said cover member, and means for maintaining said cover member open during the operation of said firearm and thermostatically controlled by heat emitted from said firearm.

PAUL R. DE PERMENTIER.

REFERENCES CITED

The following references are of record in the file of this patent:

UNITED STATES PATENTS

| Number | Name | Date |
|---|---|---|
| 2,221,905 | Berlin | Nov. 19, 1940 |
| 2,273,839 | De Port et al. | Feb. 24, 1942 |

FOREIGN PATENTS

| Number | Country | Date |
|---|---|---|
| 413,968 | Great Britain | July 26, 1934 |
| 457,570 | Great Britain | Dec. 1, 1936 |
| 510,709 | Great Britain | Aug. 4, 1939 |
| 804,838 | France | Aug. 10, 1936 |